United States Patent [19]
Wolf et al.

[11] Patent Number: 5,540,534
[45] Date of Patent: Jul. 30, 1996

[54] BALE TRANSFER SYSTEM AND METHOD OF TRANSFER

[75] Inventors: Robert J. Wolf, Waukesha; LeRoy J. W. Schumann, Wauwatosa, both of Wis.

[73] Assignee: Logemann Brothers Company, Milwaukee, Wis.

[21] Appl. No.: 192,075

[22] Filed: Feb. 4, 1994

[51] Int. Cl.$^6$ ..................................................... B65G 67/04
[52] U.S. Cl. ...................... 414/400; 100/188 R; 414/743; 414/769; 414/773; 414/778
[58] Field of Search ..................................... 414/400, 743, 414/769, 773, 778, 786; 100/188 R

[56] References Cited

U.S. PATENT DOCUMENTS

| | | | |
|---|---|---|---|
| 2,390,306 | 12/1945 | Hunziker | 100/188 R X |
| 2,649,945 | 8/1953 | McClellan | 100/188 R X |
| 3,082,588 | 3/1963 | Jay et al. | 100/188 R X |
| 3,126,069 | 3/1964 | Shepley | 100/188 R X |
| 3,583,164 | 6/1971 | Sherrill | 100/188 R X |
| 3,612,309 | 10/1971 | Van Doorn et al. | 414/773 X |
| 3,625,374 | 12/1971 | Hemphill | 100/188 R X |
| 4,256,434 | 3/1981 | Stodt et al. | 414/400 X |
| 4,995,780 | 2/1991 | Dietzler | 414/400 |

*Primary Examiner*—David A. Bucci
*Assistant Examiner*—Janice L. Krizek
*Attorney, Agent, or Firm*—Paul R. Puerner

[57] ABSTRACT

A bale transfer system for transferring bales from a baler mechanism to a support vehicle including a baler mechanism a bale tipper mechanism and a bale receiving station for receiving bales ejected from the baler mechanism. Each bale when ejected has a height dimension and a width dimension. A tipper mechanism is mounted at the bale receiving station and is operable to reposition a bale 90° so that its height dimension becomes its width dimension. A bale loading means is provided for loading the repositioned bales into a transport vehicle. The tipper is comprised of a rotatable bale tipping wing having a bale support surface and a rotatable bale support wing having a bale support surface. The bale tipper mechanism further includes a power means for activating the tipping and support wings to thereby reposition a bale 90° as it is moved from the tipping wing support surface to the support wing support surface.

7 Claims, 6 Drawing Sheets

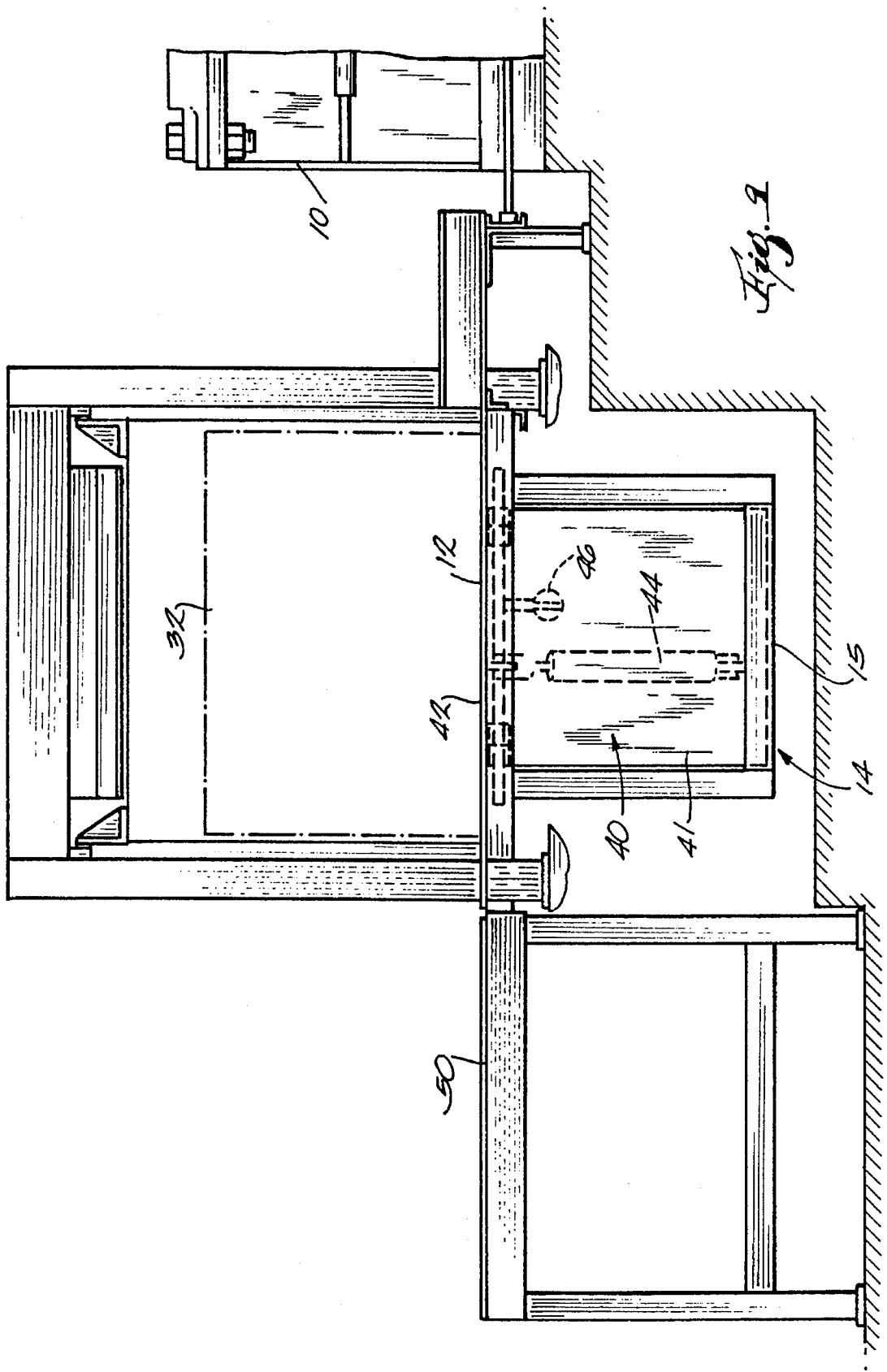

BALE TRANSFER SYSTEM AND METHOD OF TRANSFER

BACKGROUND OF THE INVENTION

The bale transfer system of the present invention is particularly adapted for use in relatively large municipal refuse handling installations where large volumes of refuse must be handled on a daily basis.

More particularly, the system of the present invention is designed to rapidly and efficiently transfer continuously produced bales of refuse from a multiplicity of baler mechanisms to single or multiple loading stations for subsequent loading on a fleet of transport vehicles. In a typical municipal refuse handling system, the bales are transported by the transport vehicles to a suitable landfill location.

An important object of the present invention is to not only perform the bale transfer method rapidly and efficiently, but to do so with highly automated equipment requiring a minimum of operating personnel.

SUMMARY OF THE INVENTION

The bale transfer system of the present invention is operable to continuously and rapidly transfer bales from a baler mechanism to a transport vehicle loading station where the bales are then loaded into a transport vehicle. The system includes a baler mechanism, a bale tipper mechanism and a bale receiving station for receiving bales ejected from the baler mechanism. The ejected bales have a height dimension and a width dimension. A tipper mechanism is mounted at the receiving station which is operable to reposition each ejected bale so that its height dimension becomes its width dimension. A bale loading means is provided for transferring the bales from the tipper mechanism to a bale loading station from which the bales are loaded into a transport vehicle by a bale loader ram.

BRIEF DESCRIPTION OF THE DRAWING

FIG. 9 is a view taken along line 9—9 of FIG. 1.

DETAILED DESCRIPTION OF THE PREFERRED EMBODIMENT

Figure 1:
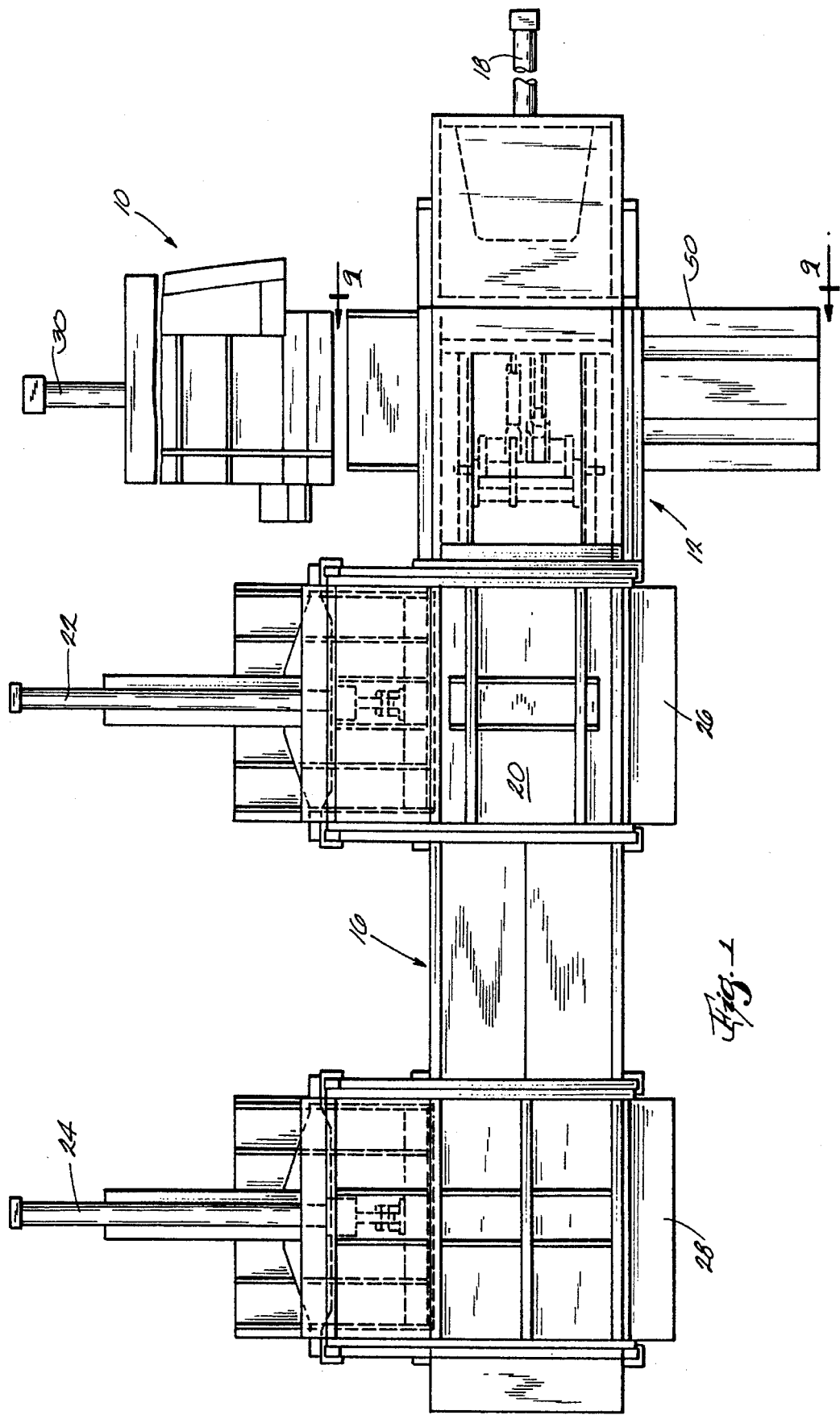
FIG. 1 is a partially schematic plan view of the bale tipper/bale loader assembly.
Figure 2:
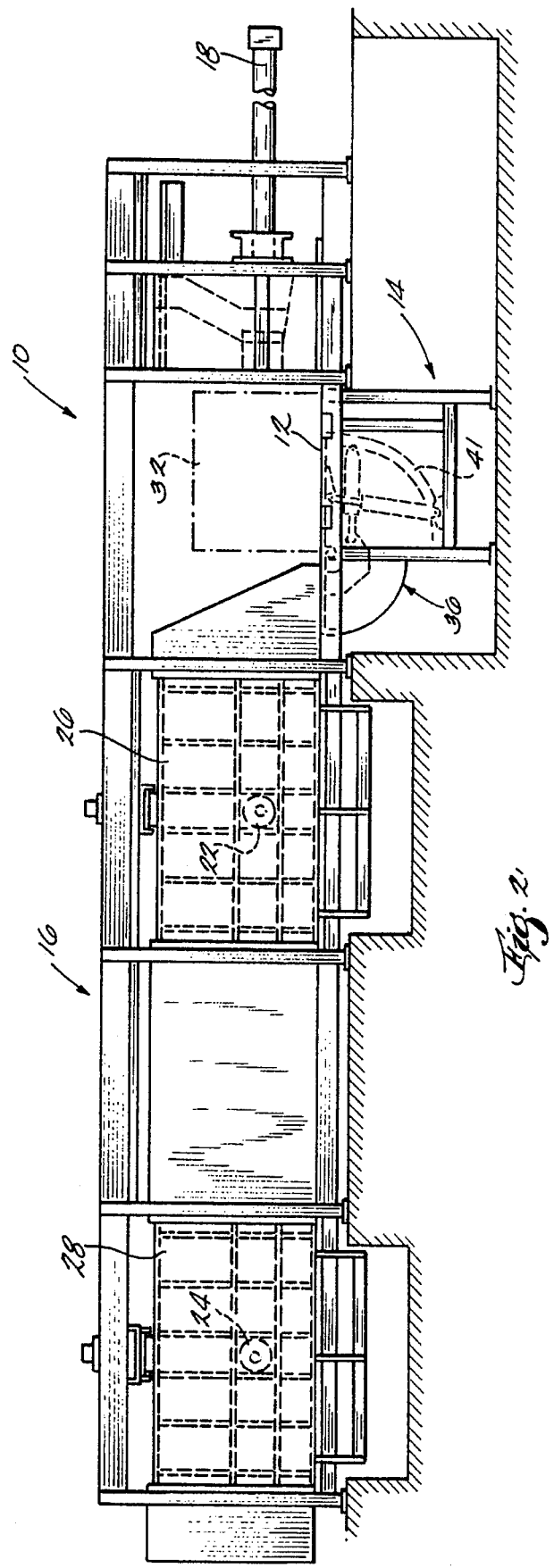
FIG. 2 is a partially schematic side elevation view of the plan view shown in FIG. 1.

FIGS. 1 and 2 show a plan and side elevation view of the overall layout of the bale tipper/loader assembly of the present invention. The basic components of the assembly include a baler and bale tier mechanism 10 (shown partially), a bale receiving station 12, a bale tipper mechanism 14, a bale loading dock conveyor assembly 16 (comprised of an hydraulic indexing cylinder 18 and a conveyor ramp 20) and a single or multiple hydraulic bale loader rams 22, 24 mounted opposite bale loader stations 26, 28.

Figure 3:
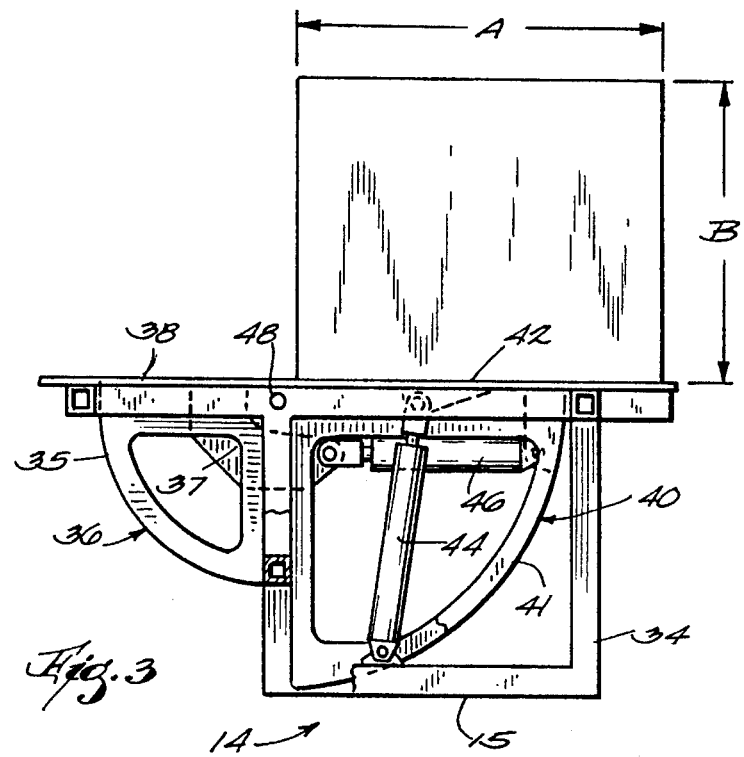
FIGS. 3–7 are partially schematic side elevation sequential views of the bale tipper mechanism showing the sequence of its operation.

Bales are formed and tied in baler mechanism 10 and are sequentially ejected therefrom by an hydraulic cylinder 30 onto the bale receiving station 12 to a position shown in FIG. 3.

In a typical embodiment of the invention, the height B of the bale 32, as shown in FIG. 3 can be more consistently controlled than the width A of the bale 32, i.e., the height of the bale can be consistently held to a given dimension as compared to the width of the bale.

In a typical baling operation, the refuse material is compressed into the baling chamber by a horizontally reciprocating baling ram (not shown). As the bale is formed, refuse material is compressed to a relatively high degree in the direction of the line of force exerted by the horizontally reciprocating baling ram, i.e., the compression force is greater across the width of the bale as compared to the forces built up in the vertical height of the bale.

The bale is ejected from the baling chamber in a direction extending at right angles to the bale compacting direction. When so ejected, the bale will expand to a greater degree across its width as compared to its height due to the greater internal forces built up in the refuse material during the bale forming operation. It is this tendency of the bale to expand across its width to a greater extent than it expands across its height which must be accommodated in the loading operation which follows.

In a typical embodiment, the bale 32 will be formed to provide a relatively constant height dimension such as approximately 40–43 inches. Because of the nature of the baling operation, the width dimension of the bale will vary to a greater extent, i.e., for example, in the range of 45–50 inches.

As will be explained in greater detail hereinafter, in order to facilitate loading of each bale into a transport truck, it is desirable that each bale be repositioned 90° so that its more constant vertical height dimension .B becomes the horizontal width dimension. Such repositioning will also cause width dimension A to become the less constant vertical dimension.

In the preferred embodiment of the invention, this repositioning is accomplished by the bale tipper mechanism 14, the sequential operation of which is shown in FIGS. 3–7.

Tipper mechanism 14 is comprised of a frame 34, a support wing 36 having a support surface 38 thereon, a tipping wing 40 having a tipping support surface 42 thereon, a tipping power cylinder 44 and a support power cylinder 46. In the preferred embodiment, cylinders 44 and 46 are hydraulically energized. The tipping wing 40 and support wing 36 are rotatably mounted on a common shaft 48.

Tipping cylinder 44 is pivotally connected at its lower end to base 15 of frame 14 and is pivotally connected at its upper end to tipping wing 40 just below support surface 42. Support cylinder 46 is pivotally connected at one end to tipping wing 40 and pivotally connected at its other end to an arm 37 fastened to support wing 36 and extending downwardly from support surface 38.

Tipping wing 40 is provided with a radial contour plate 41 and support wing 36 is provided with a radial contour plate 35. Contour plates 41 and 35 serve to prevent foreign material from falling down into the tipper mechanism 14 during the tipping operation.

OPERATION

The baled material (usually different types of refuse) is baled and tied by a mechanism 10 of any suitable construction such as that shown in U.S. Pat. No. 5,201,266. The tied bale 32 is ejected from mechanism 10 into a bale receiving station 12 located directly above bale tipping mechanism 14 as shown in FIG. 3. The bale in the FIG. 3 position will be supported on surface 42 of tipping wing 40.

It will be noted at this point that if, for example, the bale ejected from the baler is not properly formed and/or tied, the defective bale can be further ejected through station 12 onto a bale bypass table 50 as shown in FIG. 1. The defective bypassed bale can be disposed of or recycled back into the baler mechanism.

Properly compacted and tied bales 32 ejected on to surface 42 at station 12 by cylinder 30 (FIG. 3) are further transferred as follows. Each bale 32 is first repositioned from a position shown in FIG. 4 through a position shown in FIG. 5 and then to a position shown in FIG. 6. Such repositioning of each bale 32 is accomplished by actuation of tipping mechanism 14 as follows.

Figure 4:
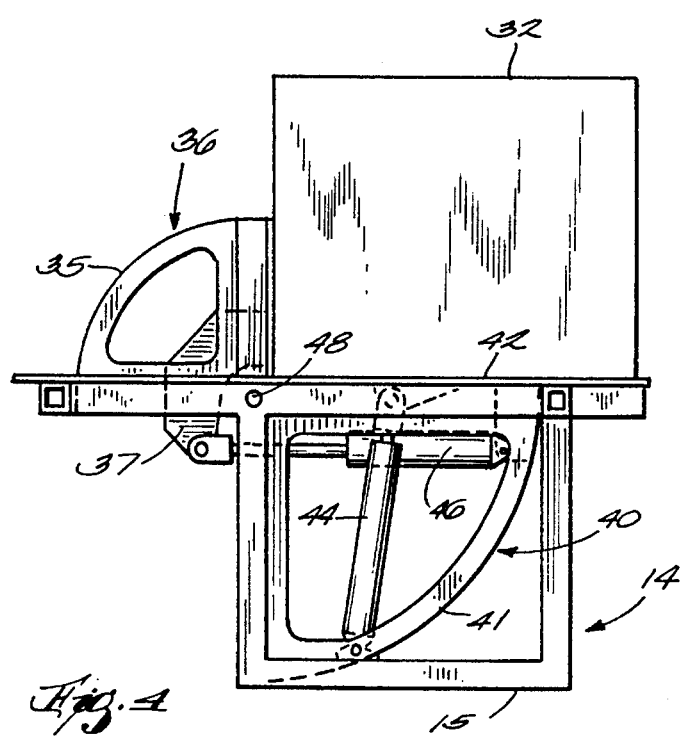

Referring to FIG. 4, the first step in the repositioning procedure is accomplished by energizing cylinder 46 in its extension direction. Energization of cylinder 46 will cause support wing 36 to be rotated 90° from its position shown in FIG. 3 to its position shown in FIG. 4. Such rotation of wing 36 will bring support surface 38 on the wing into contact with the face of bale 32 as shown in FIG. 4. When cylinder 46 reaches its FIG. 4 position, it is locked in such position by any suitable means.

Figure 5:
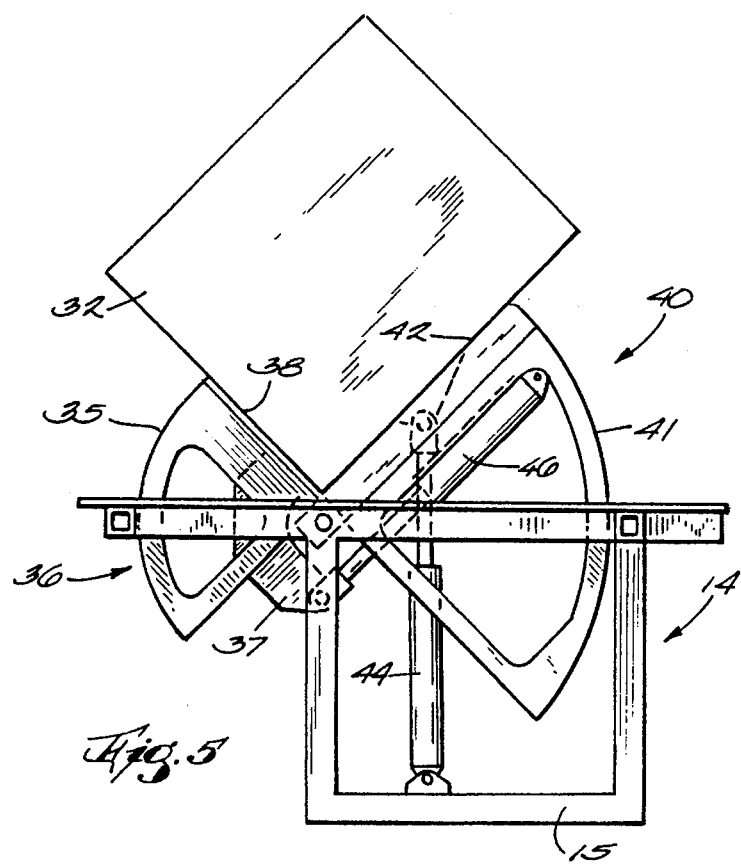

Movement of the bale between the FIG. 4 position and the FIG. 5 position is accomplished by energization of cylinder 44 causing the cylinder to be extended. Extension of cylinder 44 will cause the tipping wing 40 and the support wing 36 to be rotated together from the FIG. 4 position to the FIG. 5 position.

Figure 6:
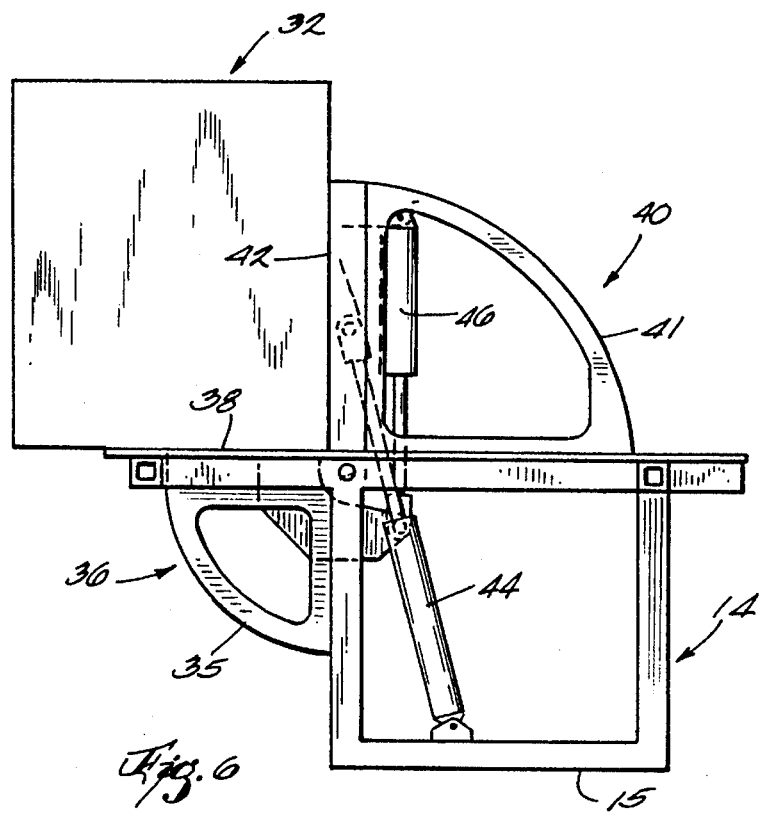

Final repositioning of the bale from its FIG. 5 position to its FIG. 6 position is accomplished by further energization of tipping cylinder 44 from its FIG. 5 position to its FIG. 6 position. This will cause the bale to come to rest at the position shown in FIG. 6 wherein the bale will be supported on support wing surface 38 which has reached a horizontal position As indicated, cylinder 46 will be locked in its extended position during movements of the mechanism from the FIG. 4 position through the FIG. 5 position to the FIG. 6 position, at which position the cylinder is unlocked.

Figure 7:
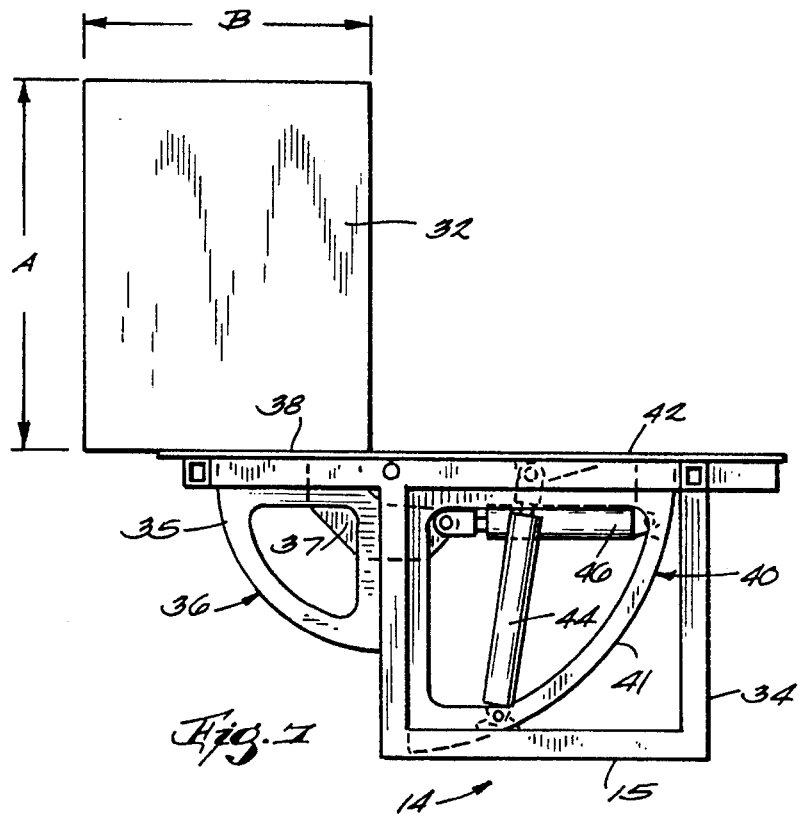
Figure 8:
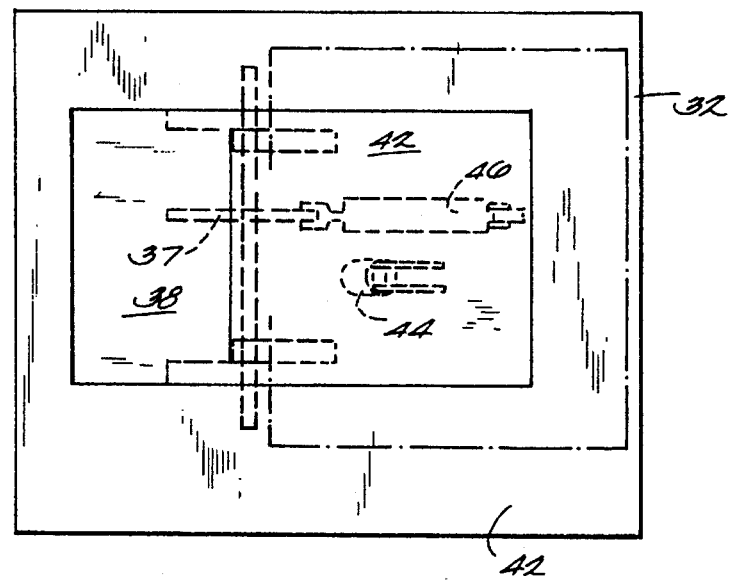
FIG. 8 is a top plan view of the bale tipper when in its FIG. 3 position.

Cylinders 46 and 44 are then retracted causing wing 40 to be rotated to its original position as shown in FIG. 7.

It will be appreciated that the bale has now been repositioned a total of 90° so that its more constant vertical height dimension B becomes the horizontal width dimension.

As shown in FIGS. 1 and 2, the bale can then be pushed off surface 38 by indexing cylinder 18 for transfer over conveyor ramp 20 to either of bale loader stations 26 or 28 depending on which loader station is to be used. In the preferred embodiment, the loading operation will be comprised of a sequence of movements as follows. Assume it is desired to load bales into a transport Vehicle parked at loading station 28. Starting with a first bale which has been tipped to the position shown in FIG. 7, indexing ram 18 is actuated to push the bale to the bale loading station 26 first. Following this bale transfer step, a second bale, after it reaches the FIG. 7 position, will be pushed along with bale 1 and transferred to the bale loading station 28 at which station the two bales will now be positioned in a side-by-side relationship. The two bales arc then pushed onto the vehicle simultaneously by actuation of the bale loading ram 24.

This bale loading procedure is then repeated until the transfer vehicle is fully loaded. In one embodiment of the present invention, transfer vehicles will accommodate a total of fourteen (14) bales, i.e., seven (7) rows of bales positioned in side-by-side relationship. Once the vehicle at station 28 is fully loaded, a second vehicle can be loaded at loading station 26 by following the same procedure as performed at the loading station 28.

It will be appreciated that when the bales are loaded onto the truck by bale loader rams 24 and 22, the more consistent width dimension B of each bale will be horizontal, thus facilitating loading multiple rows of bales into a truck trailer having a given horizontal width. The height of the truck trailer is sufficient to accommodate bales which have a less consistent final height dimensions A.

Various modes of carrying out the invention are contemplated as being within the scope of the following claims, particularly pointing out and distinctly claiming the subject matter which is regarded as the invention.

I claim:

1. A bale transfer system for transferring a bale from a baler mechanism to a transport vehicle comprising:

a baler mechanism means;

a stationary bale receiving station means for receiving bales ejected from the baler mechanism means, said bale when ejected having a height dimension and a width dimension;

a bale tipper mechanism means mounted at said receiving station means, said tipper mechanism means operable to reposition a bale so that its height dimension becomes its width dimension, said .repositioning of the bale is fully accomplished at said bale receiving station means; and a bale loading means for first moving the bale away from said bale receiving station means in its fully repositioned position and then loading said repositioned bale into a transport vehicle.

2. A bale transfer system according to claim 1 in which said bale tipper mechanism means is comprised of a rotatable bale tipping wing having a bale support surface thereon and a rotatable bale support wing having a bale support surface thereon, said bale tipper mechanism means further including a power means for activating said tipping and support wings to thereby reposition a bale 90° as it is moved from said tipping wing support surface to said support wing support surface.

3. A bale transfer system according to claim 2 in which said power means includes a tipping cylinder pivotally connected to said tipping wing and a support cylinder pivotally connected to said support wing.

4. A bale transfer system according to claim 1 in which said bale loading means includes a bale loading conveyor assembly comprised of an indexing cylinder and a conveyor ramp on which bales are moved by said indexing cylinder.

5. A bale transfer system according to claim 2 in which said rotatable bale tipping wing and said rotatable bale support wing are rotatable about a common axis.

6. A bale transfer system for transferring a bale from a baler mechanism to a transport vehicle comprising:

a baler mechanism means;

a bale receiving station means for receiving bales ejected from the baler mechanism means, said bale when ejected having a height dimension and a width dimension;

a bale tipper mechanism means mounted at said receiving station means, said tipper mechanism means operable to reposition a bale so that its height dimension becomes its width dimension; and a bale loading means for loading said repositioned bale into a transport vehicle;

said bale tipper mechanism means being comprised of a rotatable bale tipping wing having a bale support surface thereon and a rotatable bale support wing having a bale support surface thereon, said bale tipper mechanism means further including a power means for activating said tipping and support wings to thereby reposition a bale 90° as it is moved from said tipping wing support surface to said support wing support surface;

said power means including a tipping cylinder pivotally connected to said tipping wing and a support cylinder pivotally connected to said support wing;

the sequence of operation of said tipping mechanism means being to move bales between the following positions:

a first position wherein said support and tipping wings are positioned so that the support surfaces on said wings are horizontal and said bale is supported on the bale support surface of said tipping wing;

a second position wherein said support cylinder is energized to rotate said support wing 90° so that the support surface thereon will be vertical and at right angles to the support surface on said tipping wing;

a third position wherein said tipping cylinder is energized to simultaneously rotate both said support wing and said tipper wing 90° so that the support surface on said tipping wing will be vertical and the support surface on said support wing will be returned to its horizontal position with the bale supported on the support surface of said support wing; and a fourth position wherein said support and tipper cylinders are retracted to thereby return said tipping wing to its original position wherein the support surfaces on both said support wing and said tipping wing are horizontal.

7. A bale transfer system for transferring a bale from a baler mechanism to a transport vehicle comprising:

a baler mechanism means;

a bale receiving station means for receiving bales ejected from the baler mechanism means, said bale when ejected having a height dimension and a width dimension;

a bale tipper mechanism means mounted at said receiving station means, said tipper mechanism means operable to reposition a bale so that its height dimension becomes its width dimension; and a bale loading means for loading said repositioned bale into a transport vehicle;

said bale loading means including a bale loading conveyor assembly comprised of an indexing cylinder and a conveyor ramp on which bales are moved by said indexing cylinder;

said bale loading means further including at least one bale loader ram spaced along and mounted adjacent said conveyor ramp, said bale loader ram operable to move bales off said conveyor ramp and into a transport vehicle.

* * * * *